(No Model.)

H. O. HATCH.
FRYING PAN COVER.

No. 575,349. Patented Jan. 19, 1897.

WITNESSES:
A. D. Harrison
P. W. Pezzetti

INVENTOR:
Herbert O. Hatch,
by Knight Brown & Quinby
Attys.

UNITED STATES PATENT OFFICE.

HERBERT O. HATCH, OF CLIFTONDALE, MASSACHUSETTS, ASSIGNOR OF ONE-HALF TO GEORGE F. TIBBETTS, OF SAME PLACE.

FRYING-PAN COVER.

SPECIFICATION forming part of Letters Patent No. 575,349, dated January 19, 1897.

Application filed May 25, 1896. Serial No. 593,046. (No model.)

*To all whom it may concern:*

Be it known that I, HERBERT O. HATCH, of Cliftondale, in the county of Essex and State of Massachusetts, have invented certain new and useful Improvements in Frying-Pan Covers, of which the following is a specification.

This invention has for its object to provide a cover for frying-pans which, while permitting free access to the contents of the pan, so that the cook can readily insert, turn, and remove articles of food, will arrest the fat which spatters from the pan during the frying operation and cause the return of such fat to the pan, thus avoiding the soiling of the stove and the disagreeable odor which usually attend the frying of food, resulting from the falling of particles of grease on the stove.

The invention consists in the improvement which I will now proceed to describe and claim.

Figure 1:
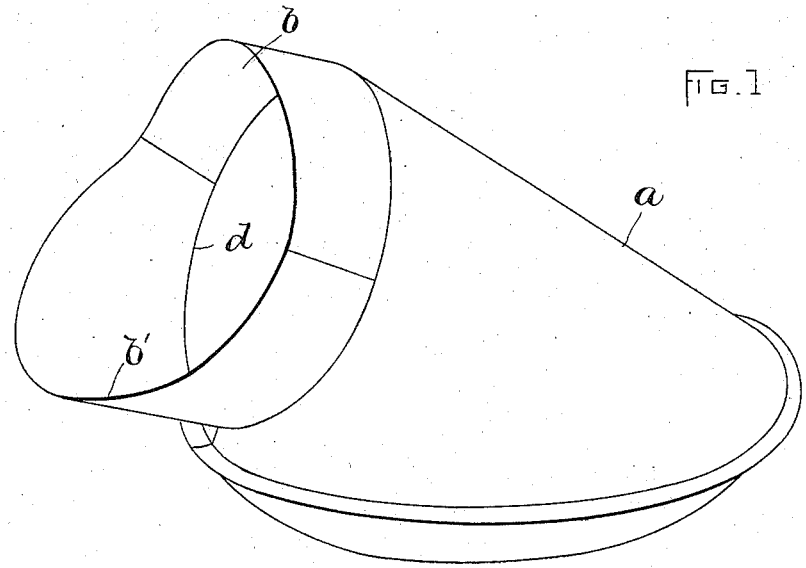
Figure 2:
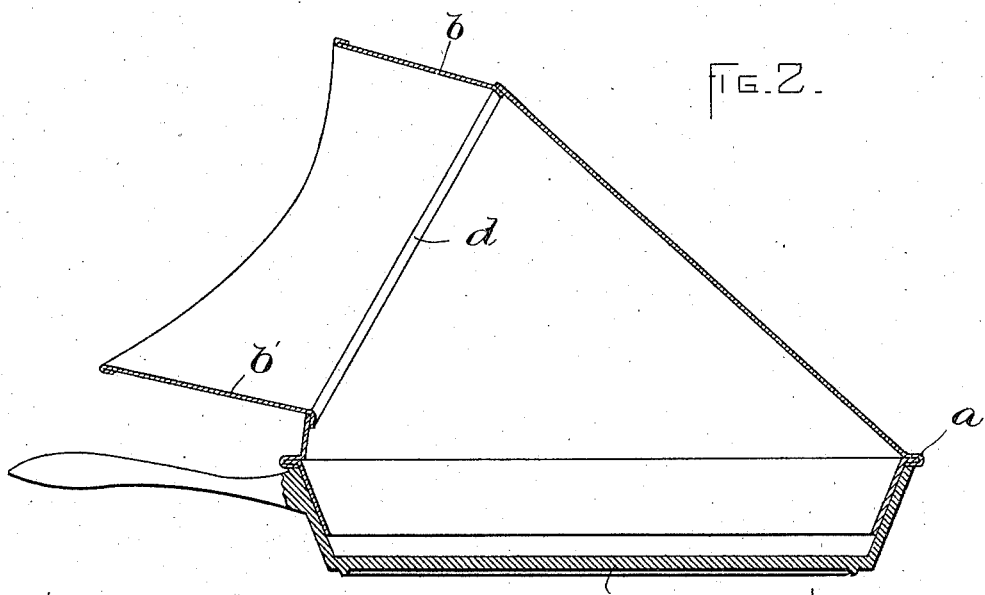

Of the accompanying drawings, forming a part of this specification, Figure 1 represents a perspective view of my improved cover. Fig. 2 represents a sectional view of the cover and a frying-pan.

The same letters of reference indicate the same parts in both figures.

In the drawings, $a$ represents the body of a frying-pan cover, which, instead of being substantially flat or gently inclined from its margin to its central portion, as usual, is abruptly inclined to form a substantially conical hood of considerable height above the plane of the circular flange $a'$, which forms the margin of the cover. In one side of said hood is formed a large opening, which is surrounded by a guard $b$, projecting outwardly from the hood. Said opening is of sufficient size to permit the ready insertion and removal of articles of food and the turning of the same while in the spider. The height of the hood is such as to afford sufficient room for the convenient manipulation of the food on the spider while cooking.

The hood $a$ in operation serves to prevent the passage of particles of grease in any direction, except the small quantity which might be thrown up across the line $d$, which is the point of juncture of the guard $b$ with the cover. Whatever particles may cross this line are stopped by the upper portion and sides of the guard $b$, while the lower portion of the guard, as at $b'$, serves to return the grease that may be caught on the top or sides of the guard.

This device absolutely serves the purpose stated of preventing the escape of grease or fat from the pan over onto the stove and at the same time permits substantially as ready access to the contents of the pan as if no cover whatever were in place. Furthermore, since no cover has to be removed for the purpose of turning the food while cooking, no grease can drop on the stove from such cover while removed.

I claim—

1. A cover for frying-pans comprising in its construction a substantially conical hood having a permanently open guard extending from one side of the hood, substantially as described.

2. A frying-pan cover consisting of the hood $a$ having an inclined top, the upper end of which is nearly over the edge of the cover, said hood being curved from said top to the side portions, and the tubular guard $b\ b'$ extending from the side of the hood, substantially as described.

In testimony whereof I have signed my name to this specification, in the presence of two subscribing witnesses, this 13th day of May, A. D. 1896.

HERBERT O. HATCH.

Witnesses:
 HORACE BROWN,
 A. W. HARRISON.